(12) United States Patent
Upmanue et al.

(10) Patent No.: US 10,948,911 B2
(45) Date of Patent: Mar. 16, 2021

(54) CO-PILOT

(71) Applicant: DENSO International America, Inc., Southfield, MI (US)

(72) Inventors: Vikas Upmanue, Novi, MI (US); Yu Zhang, Farmington Hills, MI (US); Bilal Alasry, Dearborn, MI (US); Doua Vang, Waterford, MI (US); Te-Ping Kang, Ann Arbor, MI (US); Scott Walenty, Farmington Hills, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 243 days.

(21) Appl. No.: 15/939,590

(22) Filed: Mar. 29, 2018

(65) Prior Publication Data

US 2019/0129416 A1 May 2, 2019

Related U.S. Application Data (60) Provisional application No. 62/579,555, filed on Oct. 31, 2017, provisional application No. 62/613,911, filed on Jan. 5, 2018.

(51) Int. Cl.
*G05D 1/00* (2006.01)
*B60W 50/14* (2020.01)
*B60W 40/08* (2012.01)

(52) U.S. Cl.
CPC .......... *G05D 1/0061* (2013.01); *B60W 40/08* (2013.01); *B60W 50/14* (2013.01); *B60W 2050/143* (2013.01); *G05D 2201/0213* (2013.01)

(58) Field of Classification Search
CPC ......... G05D 1/0061; G05D 2201/0213; G05D 1/0088; B60W 40/08; B60W 50/14; B60W 2050/143; B60W 40/00; B60W 40/0818; B60W 40/0827; B60W 40/0836; B60W 40/0845; B60W 40/0854; B60W 40/0872;
(Continued)

(56) References Cited

U.S. PATENT DOCUMENTS 5,774,069 A 6/1998 Tanaka et al.
9,008,961 B2 4/2015 Nemec et al.
(Continued)

FOREIGN PATENT DOCUMENTS

WO WO-2016092796 A1 6/2016
WO WO-2016109482 A1 7/2016
WO WO-2016109829 A1 7/2016

*Primary Examiner* — Anthony R Jimenez
(74) *Attorney, Agent, or Firm* — Harness, Dickey & Pierce, P.L.C.

(57) ABSTRACT

A system for monitoring vehicle drive states and transitioning between human drive control and autonomous drive control based on the vehicle drive states. The system includes a human/autonomous drive status and transition module. The module is configured to: receive data from an autonomous drive module and determine a drive state of the autonomous drive module based on the data received from the autonomous drive module; receive data from a driver status monitor (DSM) to determine a drive state of a human driver; and transition between human drive control and autonomous drive control by the autonomous drive module, and vice-versa, based on the determined drive states of the human driver and the autonomous drive module.

19 Claims, 6 Drawing Sheets

(58) Field of Classification Search
CPC .... B60W 50/00; B60W 50/082; B60W 30/00; G08B 21/00; G08B 21/02; G08B 21/0208; G08B 21/0225; G08B 21/06; G08B 21/0236; G08B 21/025; G08B 21/04; G08B 21/0438; G08B 21/0461; G08B 21/0476; G08B 21/0492; G08B 3/00; A61B 3/00; A61B 3/113; A61B 3/11; A61B 3/087; A61B 5/00; A61B 5/18; A61B 5/0077; A61B 5/02; A61B 5/0205; A61B 5/021
USPC .......................................................... 701/23
See application file for complete search history.

(56) References Cited

U.S. PATENT DOCUMENTS

| | | | |
|---|---|---|---|
| 9,063,543 | B2 | 6/2015 | An et al. |
| 9,235,211 | B2 | 1/2016 | Davidsson et al. |
| 9,365,213 | B2 | 6/2016 | Stenneth et al. |
| 9,460,601 | B2 * | 10/2016 | Mimar ............... G08B 21/0476 |
| 9,529,361 | B2 | 12/2016 | You et al. |
| 9,873,427 | B2 * | 1/2018 | Danzl ................... B60K 28/06 |
| 2010/0106356 | A1 * | 4/2010 | Trepagnier ........... G05D 1/0248 701/25 |
| 2016/0041553 | A1 | 2/2016 | Sato et al. |
| 2016/0187879 | A1 | 6/2016 | Mere et al. |
| 2016/0207537 | A1 | 7/2016 | Urano et al. |
| 2016/0355190 | A1 | 12/2016 | Omi |
| 2016/0355192 | A1 | 12/2016 | James et al. |

* cited by examiner

CO-PILOT

CROSS-REFERENCE TO RELATED APPLICATIONS

This application claims the benefit of U.S. Provisional Application No. 62/579,555 filed on Oct. 31, 2017, and U.S. Provisional Application No. 62/613,911 filed on Jan. 5, 2018. The entire disclosures of each of these provisional patent applications are incorporated herein by reference.

FIELD

The present disclosure relates to a vehicle co-pilot system, including systems and methods for transitioning between human drive control and at least partially autonomous drive control.

BACKGROUND

This section provides background information related to the present disclosure, which is not necessarily prior art.

Vehicles are being provided with autonomous drive functionality at an ever increasing rate. While current autonomous drive systems are suitable for their intended use, they are subject to improvement. In particular, the transition between human drive control and autonomous drive control is subject to improvement. The present disclosure advantageously includes systems and methods that improve the transition between human drive control and at least partially autonomous drive control.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
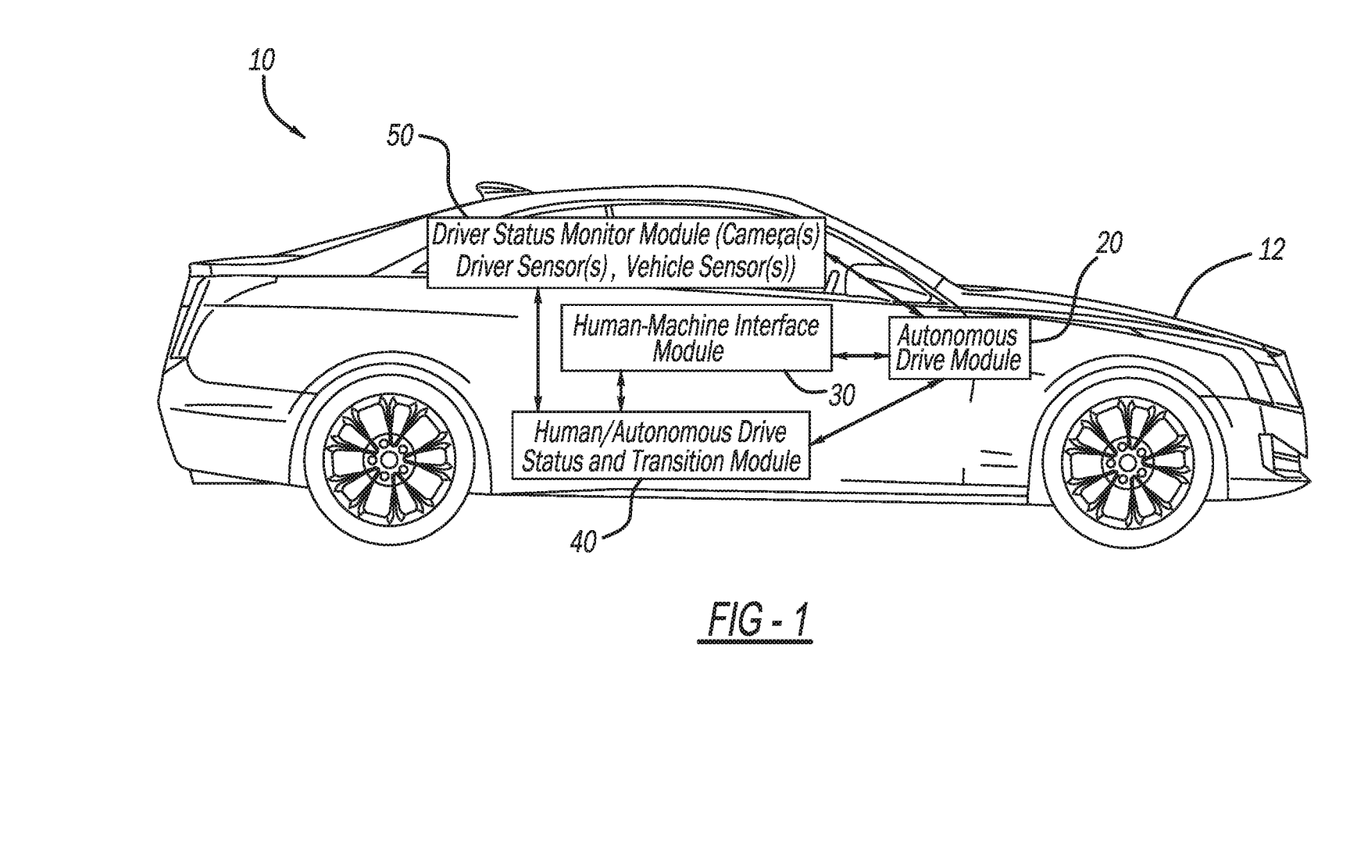
FIG. 1 illustrates a system in accordance with the present disclosure for monitoring vehicle drive states and transitioning between human drive control and autonomous drive control based on the vehicle drive states.

With initial reference to FIG. 1, the present disclosure advantageously includes a system 10 for monitoring, and transitioning between, drive states of a vehicle 12. The drive states generally include human drive control and autonomous drive control, such as at least partially autonomous drive control of the vehicle 12 by autonomous drive (AD) module 20. The vehicle 12 can be any suitable vehicle, such as any suitable passenger vehicle, recreational vehicle, mass transit vehicle, military vehicle, military equipment, construction vehicle, construction equipment, watercraft, aircraft, etc.

In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The autonomous drive module 20 is configured for autonomously operating the vehicle 12. The autonomous drive module 20 can be any suitable autonomous drive module for providing any suitable degree of autonomous control. For example, the autonomous drive module 20 can be configured to provide at least the following levels of automation, as designated by the Society of Automotive Engineers (SAE): Level 1 (drive assistance); Level 2 (partial automation); Level 3 (conditional automation); Level 4 (high automation); or Level 5 (complete automation). As explained in detail herein, the system 10 advantageously takes into account various predetermined time thresholds prior to transitioning from one state to another. These thresholds allow for proceeding safely to the next state, thereby confirming what the next state will be within the autonomous vehicle 12, such as human-led driving, vehicle-led driving, or an emergency exit in which the autonomous drive module 20 safely pulls the vehicle 12 over to the side of the road.

The system 10 advantageously provides the human operator with a demonstrable way of knowing what state the autonomous drive module 20 is in (i.e., whether it can operate in autonomous drive (AD) mode or not, and what Level of autonomous drive is available, such as Level 1, Level 2, Level 3, Level 4, or Level 5). The system 10 is also configured to detect the driver's capability to continue driving or take over driving, if necessary. Thus, the system 10 includes any suitable human-machine interface (HMI) 30, which is configured to inform the driver in any suitable manner of the available functionality of the autonomous drive module 20, and the driver's ability to control the vehicle 12. The HMI 30 can relay this information to the human operator in any suitable manner, such as with any suitable audible, visual, and/or haptic feedback. A number of exemplary visual feedback graphics are explained herein and illustrated in FIGS. 3A-3G, 4A-4C, 5A-5G, 6A-6B, and 7A-7D.

Reference to AD (autonomous drive) mode in this application means that the system 10 is in the "human not driving" state where the AD module 20 is controlling vehicle's lateral and longitudinal control. AD capable means that the AD module 20 can confidently take over the driving task if commanded to do so by the system 10. Furthermore, "AD not capable" does not necessarily mean that the AD module 20 immediately loses the ability to safely operate the vehicle 12. It may also describe situations where the AD module's 20 operational confidence level drops below a certain threshold (such as, for example, due to entering a section of road with poor lane markings, etc.), after which the AD module 20 can only continue safely operating the vehicle 12 for a very limited time or distance before the AD module 20 loses the complete ability to safety operate the vehicle 12.

As illustrated in FIG. 1, the system 10 further includes a human/autonomous drive status and transition module 40, which receives data from the autonomous drive module 20 to determine the drive state of the autonomous drive module 20. The human/autonomous drive status and transition module 40 also receives data from a driver status monitor (DSM) and vehicle sensors module 50 to determine the drive state of the human driver and of the vehicle 12 as operated by the human. The DSM 50 can be any suitable system for monitoring the driver and can include, for example, cameras, sensors monitoring the driver, sensors monitoring operation of the vehicle 12 by the driver, etc. The human-machine interface (HMI) 30 provides notifications to the driver regarding the drive states of the human and/or autonomous drive module. The human/autonomous drive status and transition module 40 manages transitions between various degrees of human and autonomous control based on the drive states of the driver and the autonomous drive module, as explained in detail herein. The human/autonomous drive status and transition module 40 guides (operates) the HMI 30 to take proper informing/safety measures during the transitions. The module 40 takes into account various thresholds, which allow the system 10 to transition to the next state and apply safety measures accordingly.

Figure 2A:
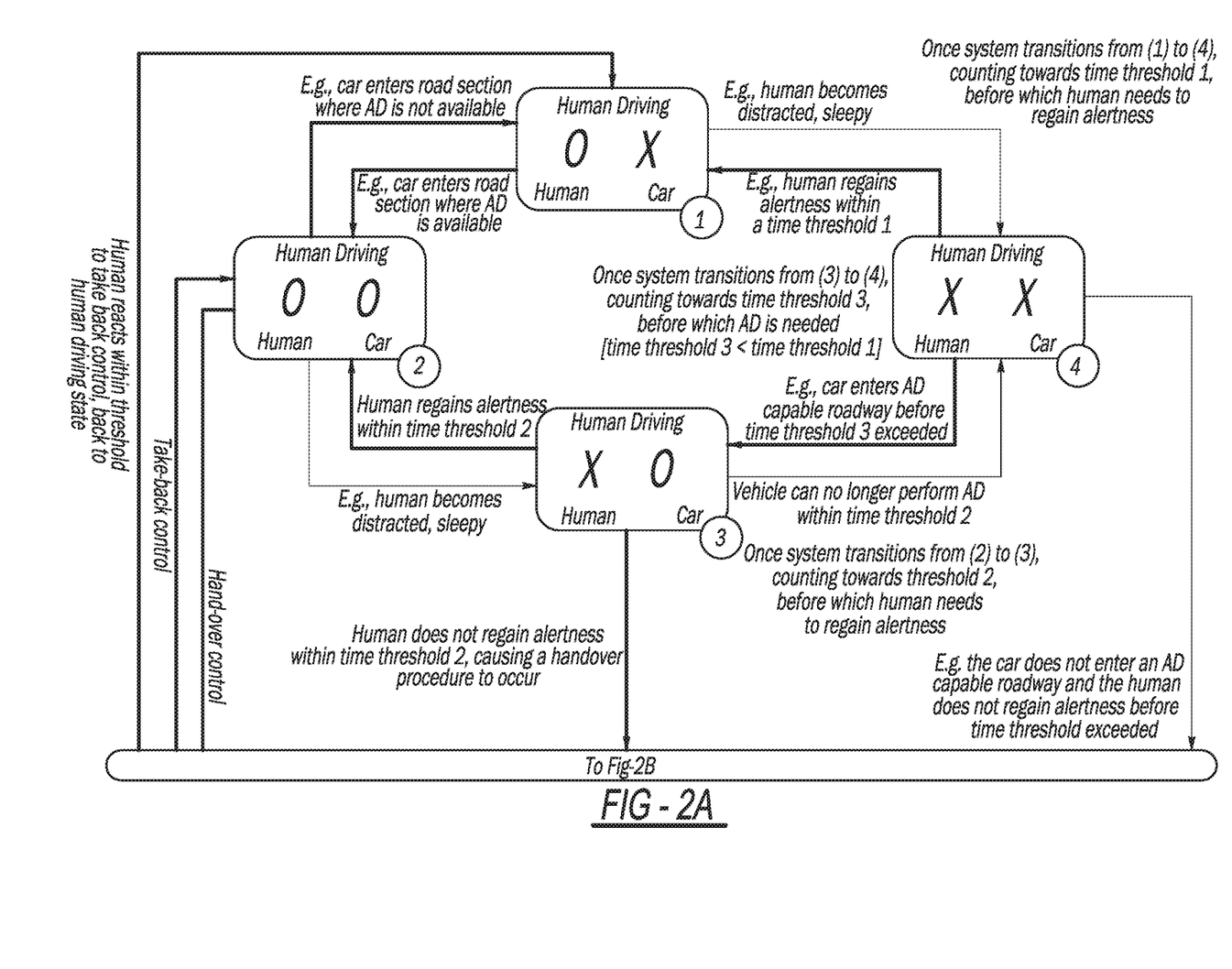
FIG. 2A and FIG. 2B illustrate various exemplary system states and transitions therebetween in accordance with the present disclosure, the system states identified by, and the transitions carried out by, the system of FIG. 1.
Figure 2B:
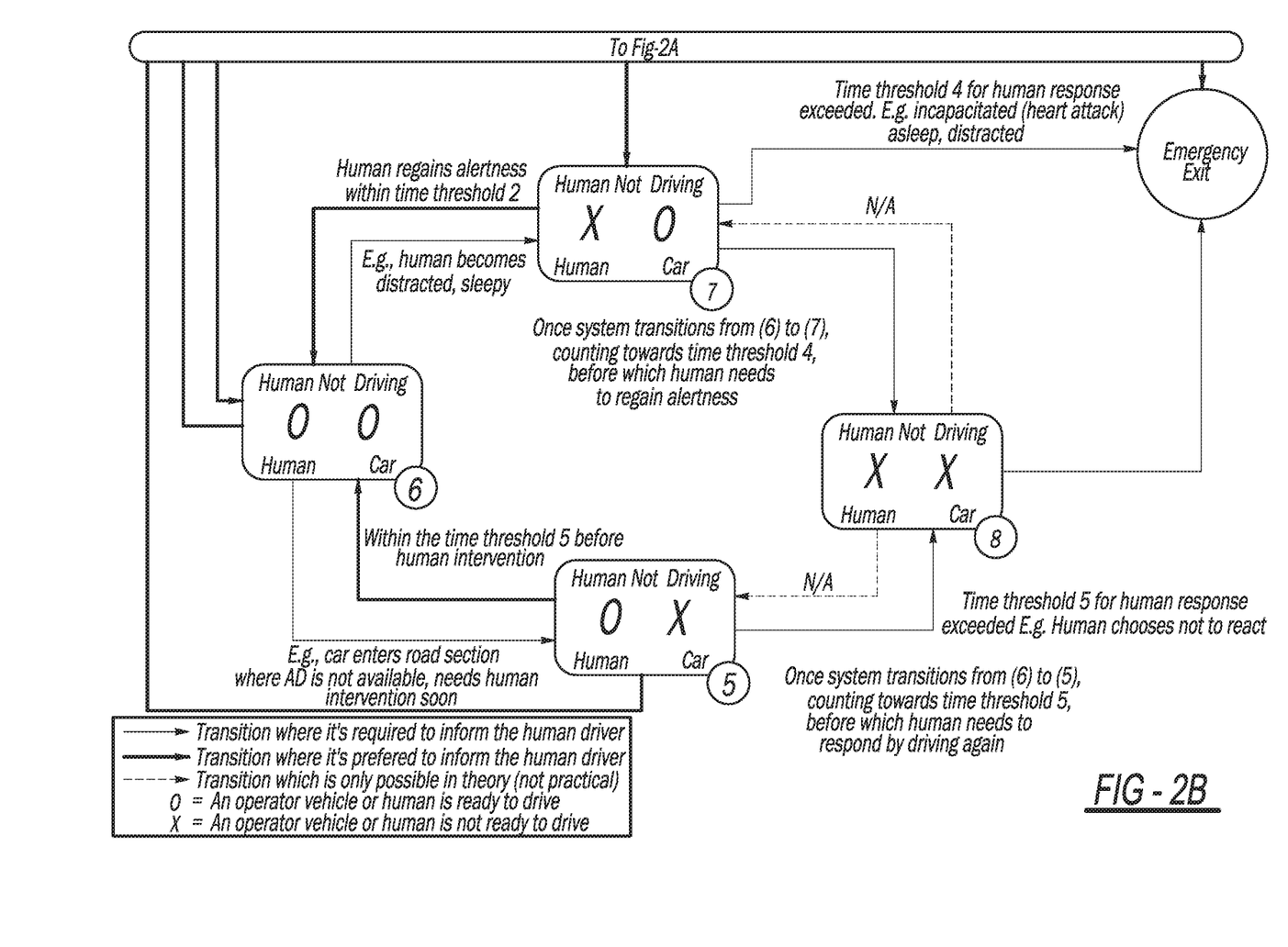
Figure 3A:
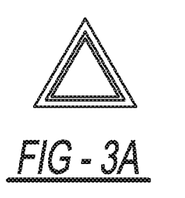
FIGS. 3A, 3B, 3C, 3D, 3E, 3F, and 3G illustrate various icons that the system of FIG. 1 is configured to display to convey information to a human operator of a vehicle during operation of the vehicle by an autonomous drive module.
Figure 3B:
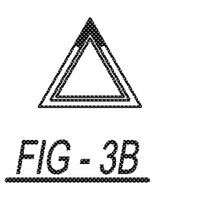
Figure 3C:
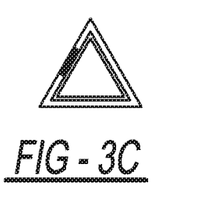
Figure 3D:
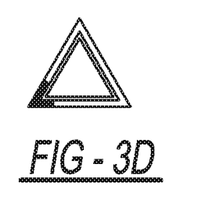
Figure 3E:
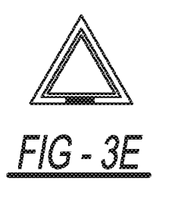
Figure 3F:
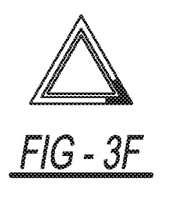
Figure 3G:
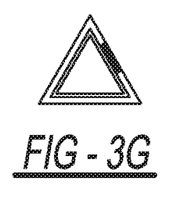

The system 10, and the module 40 thereof, of the present disclosure provides drivers with a threshold that, based on driver alertness or the vehicle's autonomous drive capability, will transition the system 10 to a new state. As illustrated in FIGS. 2A and 2B and summarized in Table 1 below, there are eight system states; four under "human driving state" and four under "human not driving state." In the "human driving state," the states are: 1) human ready, car not ready; 2) human ready, car ready; 3) human not ready, car ready; 4) human not ready, car not ready. In the "human not driving state," (i.e., vehicle—led driving) the states are: 5) human ready, car not ready; 6) human ready, car ready; 7) human not ready, car ready; 8) human not ready, car not ready (see FIGS. 2A and 2B).

TABLE 1

| From State | To State | Who is driving | Use Cases | HMI |
|---|---|---|---|---|
| 1 | 2 | Human | Vehicle enters road section where automated driving is available | Visual (HUD, Cluster, Center Stack), Audio (Chime, Text-to-Speech) |
| 1 | 4 | Human | Human driver becomes distracted or sleepy | DSM, Visual (HUD, Cluster, Center stack), Audio (Chime, Text-to-speech), Haptic, Scent |
| 2 | 1 | Human | Car enters road section where automated driving is not available | Visual (HUD, Cluster) |
| 2 | 6 | Transition | Human driver hands over control to the AD system | Activation Button, Visual (HUD, Cluster, Center stack), Audio (Chime, Text-to-speech) |
| 2 | 3 | Human | Human driver becomes distracted or sleepy | DSM, Visual (HUD, Cluster, Center stack), Audio (Chime, Text-to-speech), Haptic, Scent |
| 3 | 2 | Human | Human regains alertness within a certain time threshold after becoming distracted/sleepy, while the vehicle is AD capable | DSM, Visual (HUD, Cluster, Center Stack) |
| 3 | 4 | Human | Vehicle is no longer AD capable while human is not ready for driving | DSM, Visual (HUD, Cluster, Center stack), Audio (Warning), Haptic |
| 3 | 7 | Transition | Human doesn't regain alertness within a certain threshold after becoming distracted/sleepy while the vehicle is AD capable, causing handover to occur | DSM, Visual (HUD, Cluster, Center Stack), Audio (Chime, Text-to-speech) |
| 4 | 1 | Human | Human regains alertness within a certain threshold after becoming distracted/sleepy, while the vehicle is not AD capable | DSM, Visual (HUD, Cluster, Center Stack) |

TABLE 1-continued

| From State | To State | Who is driving | Use Cases | HMI |
|---|---|---|---|---|
| 4 | 3 | Human | While human is distracted/sleepy and vehicle is not currently AD capable, vehicle then becomes AD capable. | Visual (HUD, Cluster, Center Stack) |
| 4 | 9 | Exit | Human is distracted/sleepy and vehicle is not currently AD capable. After a certain predetermined time is exceeded, the emergency exit action is initiated | DSM, emergency exit strategy (pull over, stop in current lane, turn on hazards, contact EMS), Audio (Warning) |
| 5 | 1 | Transition | While in AD mode with vehicle no longer AD capable but human is ready to drive, human takes back control. | Visual (HUD, Cluster, Center stack), Audio (Warning), Haptic, Deactivation button/mechanism |
| 5 | 6 | Not Human | While in AD mode and vehicle is not AD capable, AD capability recovers before human intervention occurs. | Visual (HUD, Cluster, Center stack), Audio (Chime, Text-to-speech) |
| 5 | 8 | Not Human | While in AD mode and vehicle is not AD capable, although human appears alert the human chooses to not intervene within a certain threshold. | Visual (HUD, Cluster, Center stack), Audio (Warning), Haptic |
| 8 | 9 | Exit | Although in AD mode, vehicle is not AD capable and human is not responding. After a certain time is exceeded, emergency exit is initiated. | Emergency exit strategy (pull over, stop in current lane, turn on hazards, contact EMS), Audio (Warning), Haptic |
| 6 | 2 | Transition | Human driver takes back control from the AD system. | Deactivation button/mechanism, Visual (HUD, Cluster), Audio (Chime, Text-to-speech) |
| 6 | 5 | Not Human | While in AD mode, vehicle becomes no longer AD capable. | Visual (HUD, Cluster, Center stack), Audio (Warning), Haptic |
| 6 | 7 | Not Human | While in AD mode, human becomes distracted/sleepy. | DSM, Visual (HUD, Cluster, Center stack), Audio (Chime, Text-to-speech) |
| 7 | 6 | Not Human | While in AD mode, human regain alertness within a threshold after being distracted/sleepy | DSM, Visual (HUD, Cluster, Center stack) |
| 7 | 8 | Not Human | While in AD mode with a distracted/sleepy human, vehicle becomes no longer AD capable. | Visual (HUD, Cluster, Center stack), Audio (Warning), Haptic |
| 7 | 9 | Exit | While in AD mode, human does not regain alertness within a threshold (e.g., becomes incapacitated), causing an emergency exit action to be initiated. | Emergency exit strategy (pull over, stop in current lane, turn on hazards, contact EMS), Audio (Warning), Haptic |
| 8 | 7 | Not Human | While in AD mode with a distracted/sleepy human and vehicle that's no longer AD capable, vehicle regains AD capability before emergency exit action is initiated. | This state change does not affect HMI action. |
| 8 | 5 | Not Human | While in AD mode with a distracted/sleepy human and vehicle that's no longer AD capable, human regains alertness before emergency exit action is initiated. | This state change does not affect HMI action. |

When a transition between states occurs, the HMI 30 informs the human operator. The HMI 30 can be configured to inform the human operator of various transitions with a relatively mild alert (e.g., chimes, text-to-speech, or moderate graphic change), for example, when the vehicle 12 (and AD module 20 thereof) enters/exits an automated driving (AD) capable condition while the human operator is actively driving. The HMI 30 can also be configured to inform the human operator of various other transitions a more salient way with more intensity (e.g., multiple stage of visual-haptic-audio warning), for example, when the autonomous drive module 20 will no longer be able to perform AD driving while the human operator is not actively driving. Thresholds here are used to set the limit of state durations, in which the system 10 is considered as unstable and needs to change to other states. With these thresholds, the system 10 can correctly recognize a state change and take corresponding safety measures. For example and as illustrated in FIGS. 2A and 2B, when the system enters state 4 (human is not ready while the vehicle 12 is also not ready) from state 1 (human is ready while the car is not ready for AD), a threshold will be applied to set allowable time for the driver to regain readiness from a non-ready state (for example, distracted or asleep state). In case the driver regains alertness within this predetermined time threshold, the system returns to state (1); otherwise, an emergency exit strategy has to occur.

The system 10 is configured to allow a human operator of the vehicle 12, as well as the vehicle 12 itself, to enter and exit system states based on the human operator's need/want to be in control as well as, the capability of the autonomous drive module 20 to be in control. This entering and exiting of states of the system 10 is through transitions that depend on the human operator's readiness/capacity, as well as the readiness and capabilities of the autonomous drive module 20 at that moment. The system 10 takes into account thresholds that check the human operator for alertness as well as the capabilities of the autonomous drive module 20 (and the vehicle 12 generally) during a transition.

The driver status monitor 50 includes various components to detect human and vehicle readiness. For example, the driver status monitor 50 can include any suitable cameras and/or driver sensors configured to monitor the state of the human operator, such as his or her alertness, focus on the road, etc. The driver status monitor 50 may also include any vehicle sensors to monitor the operational state of the vehicle 12, such as in-vehicle sensors, sensor capability assessors and other intelligence algorithms to determine vehicle operation states. The human-machine interface 30 includes any suitable HMI components configured to ensure the effective communication between the human operator and the vehicle 12, including: a heads-up display (HUD), instrument cluster, center stack display, chime, text-to-speech or intelligent voice agent, haptic feedback, scent feedback, audio warning, AD function activation/deactivation mechanism, and an emergency exit strategy.

The HMI 30 provides information to the driver based on the transitions occurring in this human-car-co-driving system 10. FIGS. 2A and 2B illustrate, and Table 1 above explains, the possible state transitions of the system 10 (when only one element of three, i.e., human's driving readiness, car-led driving readiness and who is actively driving, changes), and how the HMI 30 is configured to convey these transitions to the human operator. A transition occurs as a driver/car state changes or a hand-over of driving occurs. The transitions between the different states described below are carried out by the human/autonomous drive status and transition module 40, which can activate the AD module 20 to provide autonomous operation of the vehicle 12 when available, or deactivate the AD module 20 to permit human operation of the vehicle 10.

When the system 10 is in state 1 of FIGS. 2A and 2B (and Table 1 above), the human operator is actively driving or is ready to drive, but the autonomous drive module 20 is not ready to operate the vehicle 12 (such as due to driving conditions or some other issue with the module 20), two transitions are available. First, the module 40 could transition to state 2, in which the human operator is actively driving and both the human operator and the autonomous drive module 20 are ready to operate the vehicle 12. An exemplary situation would be when the vehicle 12 has entered a road section where autonomous driving is available. In this situation, the HMI 30 is configured to inform the human operator in a mild fashion using moderate visual changes in, for example, a HUD cluster, center stack, or using mild audio cues such as a chime or text-to-speech.

Another possible transition is to state 4 of FIGS. 2A and 2B, whereby the human operator is actively driving, but becomes no longer ready to drive and the autonomous drive module 20 is not ready to drive. For example, the human operator becomes distracted or sleepy during active driving. In this case, the DSM 50 detects that the human operator is no longer in a state sufficient for maintaining safe driving. The HMI 30 is then configured to send strong visual cues (via HUD, cluster, and/or center stack, for example) in conjunction with strong audio warnings (e.g., warning chime, text-2-speech), haptic warnings, or scent interventions to help the human operator regain readiness.

When the vehicle 12 is in state 2 of FIGS. 2A and 2B, in which the human is actively driving, and both human and the autonomous drive module 20 are ready to drive, the system 12 includes three possible transitions. The first possible transition is that the module 40 transitions to state 1 (human is actively driving, human is ready to drive, but the autonomous drive module 20 is not ready to operate the vehicle 12). For example, the autonomous drive module 20 may not be ready to operate the vehicle 12 when the vehicle 12 enters a road section where automated driving is not available. In this case, the HMI 30 is configured to send a mild visual or audio cue (such as a moderate visual change in HUD cluster, cluster, or a light chime). The second possible transition from state 2 is to state 6, in which the human operator is no longer actively driving, and both the human and the module 20 are ready to drive. For example, the human operator may intentionally hand over control to the autonomous drive module 20. In this case, the HMI 30 includes an activation mechanism (such as an activation button), which the driver can use to activate the autonomous drive module 20. The HMI 30 can also display confirmation of autonomous driving with any suitable visual (HUD, cluster, center stack, etc.), or audio (chime, text-2-speech) means. The third possible transition from state 2 is to state 3 (human is actively driving, car is ready to drive, but the human is no longer ready to drive), such as when the human operator becomes distracted or sleepy, for example. In this case, the DSM 50 detects that the human operator is no longer in a state sufficient to maintain safe driving. The HMI 30 is configured to send strong visual cues (via HUD, cluster, and center stack, for example) in conjunction with strong audio warnings (e.g., warning chime, text-to-speech, for example), haptic warnings, or scent interventions to help the human operator to regain readiness.

When the system 10 is in state 3, (human actively operating vehicle 12 and module 20 is ready to operate the vehicle 12, but human is not ready to continue driving due to distractions or sleepiness, for example) the system 10 can have three possible transitions. First, the module 40 can transition to state 2 (human is actively driving, both the human and car are ready to drive) if the human regains alertness within a threshold time period as detected by the DSM 50. The HMI 30 informs the operator of the transition in a mild fashion with moderate visual cues (via HUD, cluster, and center stack, for example) and/or mild audio cues (such as a chime or text-2-speech, for example).

Second, the module 40 can transition to state 4 in which the human is actively driving, but the human becomes no longer ready to drive and the module 20 is no longer ready to operate the vehicle 12. If the module 20 can no longer perform autonomous driving within a threshold due to autonomous driving functionality not being available, and the DSM 50 detects that the human operator is no longer able to maintain safe driving, then the HMI 50 is configured to send strong visual cues (via HUD, cluster, and/or center stack, for example) in conjunction with strong audio warnings (e.g., warning chime, text-to-speech), haptic warnings, or scent interventions, for example, to help the human operator regain readiness as well as to inform the human operator that the autonomous drive module 20 is not available.

Third, the module 50 can transition from state 3 to state 7, in which the human is no longer actively driving, the human is not ready to drive, and the autonomous drive module 20 is able to operate the vehicle 12. If the human does not regain the ability to operate the vehicle 12 with in a predetermined time threshold, a handover to the autonomous drive module 20 occurs. In this case, the DSM 50 detects that the operator is no longer able to safely operate the vehicle 12, and the HMI 30 is configured to display confirmation that the vehicle 12 has transitioned to a human not driving state through visual (HUD, cluster, center stack, for example) or audio (chime, text-to-speech, for example) means.

When the system 12 is in state 4, in which the human is actively driving, but the human is no longer ready to drive and the autonomous drive module 20 is no longer ready to operate the vehicle 12, the system 10 has three possible transitions. In the first possible transition, the human regains alertness within a predetermined time threshold and the system 10 returns to state 1 (human is actively driving, human is ready to drive, but the module 20 is not ready to drive). In this case, DSM 50 detects the regained alertness and the HMI 30 informs the driver of this transition using, for example, moderate visual cues (HUD, cluster, and/or center stack, for example) and/or mild audio cues (such as a chime or text-to-speech, for example).

In the second possible transition from state 4, the system 10 transits to state 3 (human is in active driving state, module 20 is ready to drive, but human is still not ready to drive due to distractions or sleepiness) if the vehicle 12 enters an autonomous drive capable roadway within a certain predetermined time threshold. In such a case, the HMI 30 is configured to inform the driver with moderate visual cues (HUD, cluster, and/or center stack, for example) or using mild audio cues, such as a chime or text-to-speech.

In the third possible transition from state 4, the system 10 transits to an emergency exit strategy (see "Emergency Exit" of FIGS. 2A and 2B) if the vehicle 12 does not enter an autonomous drive capable roadway and the human does not regain alertness before a predetermined time threshold is reached. In this case, DSM 50 detects that the human operator is no longer able to maintain safe driving and the autonomous drive module 20 is unable to operate the vehicle 12. Therefore, the autonomous drive module 20 initiates an emergency exit strategy in which the module 20 pulls the vehicle 12 to a road shoulder, stops the vehicle 12 at its current location, activates hazard lights of the vehicle 12, and contacts emergency services to request assistance. Under such circumstances, the HMI 30 is configured to generate a strong visual signal (via the HUD, cluster, and/or center stack), audio signal (e.g., warning chime, text-2-speech), and haptic warnings, as well as scent interventions, in an attempt to alert the driver.

When the vehicle 10 is in state 5 (human is no longer actively driving, but the human is ready to drive and the autonomous drive module 20 is not), the system 10 includes three possible transitions. First, the system 10 may transition to state 1 if the human acts to take control of the vehicle 12 within a predetermined time threshold. In this case, the HMI 30 includes a deactivation mechanism (such as a deactivation button), which the human can operate to deactivate the autonomous drive module 20. If the human deactivates the autonomous drive module 20, the HMI 30 will display confirmation through visual (HUD, cluster, center stack, for example) or audio (chime, text-to-speech, for example) means.

In the second possible transition from state 5, the system 10 transitions to state 6 (in which the human is no longer actively driving, and both the human and the autonomous drive module 20 are ready to drive) within a predetermined time threshold before human intervention. In this case, the vehicle 12 enters a roadway in which autonomous drive by the module 20 is available, and the HMI 30 informs the driver of the availability of the module 20 to operate the vehicle 12 in a mild fashion by using moderate visual cues (via HUD, cluster, center stack, for example) or using mild audio cues (such as chime and text-to-speech, for example).

In the third possible transition from state 5, the system 10 transitions to state 8 (human is no longer actively driving, both the human and the car are not ready to drive) in which case the predetermined time threshold for human response is exceeded, for example, if the human chooses not to react. In this case, the DSM 50 detects that the human is no longer responding and not able to safely operate the vehicle 12. The DSM 50 informs the HMI 30 of this, and in response the HMI 30 is configured to send strong visual cues (via HUD, cluster, center stack, etc.) in conjunction with strong audio warnings (e.g., warning chime, text-to-speech), haptic warnings, or scent interventions to help human operator regain readiness to operate the vehicle 12.

When the system 10 is in state 6 (human is no longer actively driving, and both the human and car are ready to drive), the system 10 has three possible transitions. First, the system may transition to state 2 (human is actively driving, both the human and car are ready to drive) when the human takes control back to the human driving state. In this case, the deactivation mechanism (such as a deactivation button) of the HMI 30 is available to the driver to deactivate the autonomous drive module 30 if necessary. If the human driver activates the deactivation mechanism, the HMI 30 will display confirmation through visual (HUD, cluster, center stack, for example) or audio (chime, text-to-speech, for example) means.

In the second possible transition from state 6, the system may transition to state 5 (human is no longer actively driving, but the human is ready to drive and the car is not), such as when the vehicle 12 enters a roadway where the autonomous drive module 20 is unable to operate the vehicle 12 and needs human intervention. The HMI 30 is configured to inform the driver by sending strong visual cues (via HUD, cluster, center stack, for example) in conjunction with strong audio warnings (e.g., warning chime, text-to-speech), haptic warnings, or scent intervention, for example.

In the third possible transition from state 6, the system 10 transitions to state 7 (human is no longer actively driving and the human is not ready to drive but the car is ready to drive with AD capability) when the human operator becomes distracted or sleepy. In this case, the DSM 50 detects that the driver is no longer capable of operating the vehicle 12 safely. The HMI 30 will send strong visual cues (via HUD, cluster, center stack) in conjunction with strong audio warnings (e.g., warning chime, text-to-speech), haptic warnings, or scent interventions, for example, to help human operator regain readiness.

When the system 10 is in state 7 (human is no longer actively driving and the human is not ready to drive, but the autonomous drive module 20 is ready to operate the vehicle 12), the system 10 has three possible transitions. In the first possible transition, the system 10 can transition from state 7 to state 6 (human is no longer actively driving, and both the human and the module 20 are ready to drive), if the human regains alertness within a predetermined time threshold. The DSM 50 detects the regained alertness, and the HMI 30 informs the driver in a mild fashion with moderate visual cues (via HUD, cluster, and/or center stack, for example) and/or mild audio cues, such as a chime or text-to-speech, for example.

In the second possible transition from state 7, the system 10 transitions to state 8 (human is no longer actively driving, both the human and the autonomous drive module 20 are not ready to drive), such as when the vehicle 12 enters a roadway where autonomous drive by the module 20 is not available and human intervention is needed within a predetermined time threshold, but the DSM 50 detects that the human operator is no longer able to safely operate the vehicle 12. Under such circumstances, the HMI 30 alerts the human that human intervention is critical by sending strong visual cues (via HUD, cluster, center stack, for example) in conjunction with strong audio warnings (e.g., warning chime, text-to-speech), haptic warnings, or scent intervention to help the human regain readiness as well as warn the human that the autonomous drive module 20 is unable to operate the vehicle 12.

In the third possible transition from state 7, the system 10 transits to an emergency exit strategy if the predetermined time threshold for a human response is exceeded (e.g., human incapacitated, heart attack, fallen asleep, distracted, for example). In this case, the DSM 50 detects that the driver is no longer able to safely operate the vehicle 12. The module 20 thus initiates an emergency exit strategy to seek help (e.g., pull over, stop in current lane, turn on hazards, contact emergency services, etc., for example). The HMI 30 is configured to send a strong visual signal (via HUD, cluster, and/or center stack), audio signal (e.g., warning chime, text-to-speech), and haptic warnings, as well as scent interventions, to attempt to alert the driver that his/her intervention to operate the vehicle 12 is required.

When the vehicle is in state 8 (human is no longer actively driving, both the human and the car are not ready to drive), there are two possible theoretical transitions and one possible practical transition from state 8. In the first possible theoretical transition, the system 10 transitions to state 7 (human is no longer actively driving and the human is not ready to drive, but the car is ready to drive with AD capability), such as when the vehicle 12 enters an roadway on which the AD module 20 capable of operating the vehicle 12 before emergency exit action is initiated. This transition is unlikely, however, because the time allowed to remain in state 8 is likely to be extremely short (much shorter than the time needed for the module 20 to regain control).

In the second possible transition from state 8, the system 10 transitions to state 5 (human is no longer actively driving, but the human is ready to drive and the AD module 40 is not), and the human regains alertness before emergency exit action is initiated. This transition is unlikely because the time allowed to remain in state 8 should be extremely short (much shorter than the time needed for the human to regain control).

In the third possible transition from state 8, the system 10 transitions to an emergency exit strategy if the predetermined time threshold for a human response is exceeded (e.g., the human is incapacitated, has a heart attack, falls asleep, becomes distracted, etc.). Under such circumstances, the DSM 50 detects that the driver is no longer able to maintain safe driving and the AD module 20 is unable to operate the vehicle 12. Therefore the AD module 20 initiates an emergency exit strategy (e.g., pulls vehicle over, stops vehicle in current lane, turns on hazards, contact emergency authorities, etc.) to request assistance. The HMI 30 sends strong visual (via HUD, cluster, and/or center stack), audio (e.g., warning chime, text-to-speech), and haptic warnings, as well as scent interventions, to attempt to alert the driver.

The HMI 30 is configured to display any suitable icons on any suitable display screen (e.g., dashboard display, center console display, and/or HUD) to provide the alerts set forth above to the human operator. FIGS. 3A-3G, 4A-4C, 5A-5G, 6A-6B, and 7A-7D illustrate various exemplary icons in accordance with the present disclosure, which may be displayed by the HMI 30 to notify the human operator of the various different situations discussed above. With respect to FIGS. 3A-3G and 5A-5G, for example, the icon is generally triangular in shape, which can include various other graphics, such as different colors and/or different gradients to indicate different notifications. Additionally, different sections or areas of the triangle can be highlighted by changing color or having additional graphics to show warnings to the driver. Secondary shapes (such as arrows or straight lines, for example) can transition off of the primary triangular shape to notify the human operator of the specific direction in which there may be a safety concern or other important information that is directional or non-direction.

The triangular icon can be configured to graphically indicate whether the human is in manual drive mode, or if the AD drive module 20 is activated and operating the vehicle 12. The triangular icon can also graphically show to the human the system's 10 assessment of the user's ability to take back manual control of the vehicle 12. During autonomous mode the graphics of the HMI 30 are more advanced and complex using solid type shapes, colors, gradients, etc. This is because during autonomous driving the human can view more complicated information and interact more with the system 10. During auto and manual mode the co-pilot graphic can graphically indicate situational awareness, blind spot monitoring, and other safety functions.

With particular reference to FIGS. 3A-3G, the triangular icon is configured in the auto drive mode in which the autonomous drive module 20 is operating the vehicle 12. In the auto drive mode, the icon may be relatively larger and incorporate more detail and convey more information (as compared to the manual drive mode illustrated in FIGS. 5A-5G, for example). In auto mode, the human operator or user may view more complicated information displayed by the HMI 30, and interact more with the system 10.

Figure 4A:
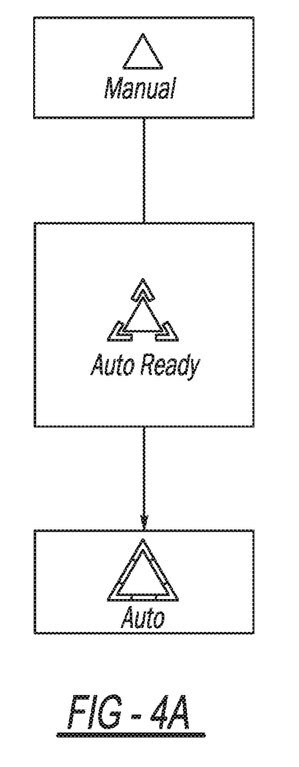
FIGS. 4A, 4B, and 4C illustrate various icons that the system of FIG. 1 is configured to display to convey transition between autonomous drive and manual drive, and vice versa.
Figure 4B:
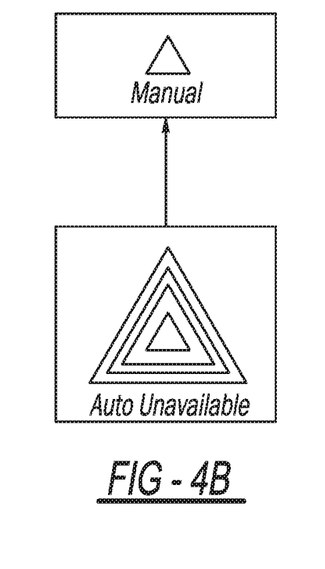
Figure 4C:
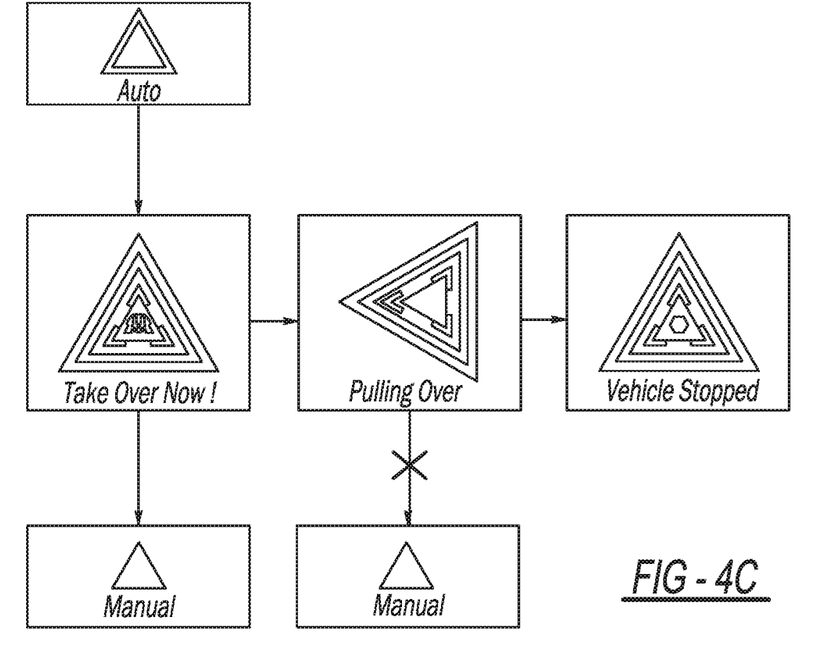
Figure 5A:
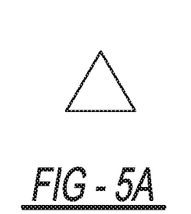
FIGS. 5A, 5B, 5C, 5D, 5E, 5F, and 5G illustrate various icons that the system of FIG. 1 is configured to display to convey information to a human operator of a vehicle during operation of the vehicle by an autonomous drive module.
Figure 5B:
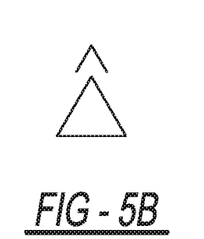
Figure 5C:
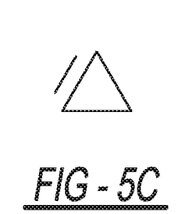
Figure 5D:
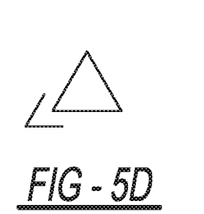
Figure 5E:
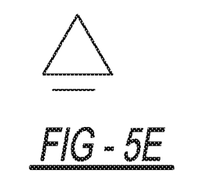
Figure 5F:
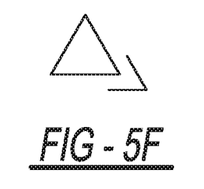
Figure 5G:
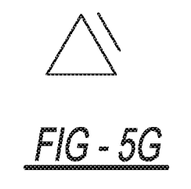
Figure 6A:
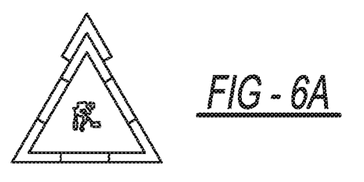
FIGS. 6A and 6B illustrate any of the icons of FIGS. 3A-3G and 5A-5G configured to display additional information to the human operator.
Figure 6B:
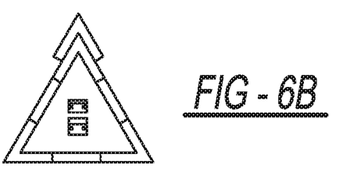
Figure 7A:
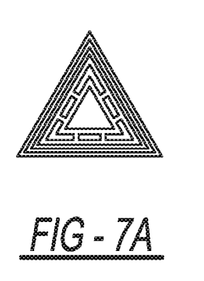
FIGS. 7A, 7B, 7C, and 7D illustrate various icons that the system of FIG. 1 is configured to display to convey to the human operator that the system hears voice commands of the driver, or is conveying information to the human operator by voice announcement.
Figure 7B:
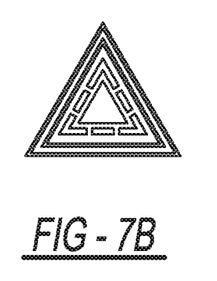
Figure 7C:
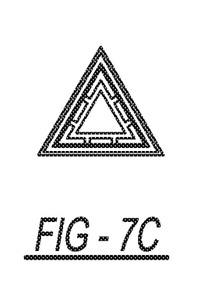
Figure 7D:
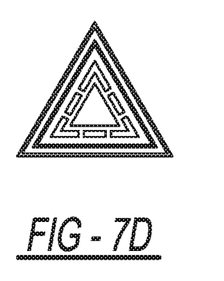

FIGS. 4A-4C display exemplary graphical display by the HMI 30 of the transition between auto mode and manual mode. FIGS. 5A-5B illustrate the triangular icon in an exemplary manual mode when the autonomous drive module 20 is not engaged, and the human operator is operating the vehicle 12. In the exemplary manual mode of FIGS. 5A-5B, the triangular icon is simplified by using outline type shapes. This allows the driver to focus and keep his/her eyes on the road eliminating distraction while driving. As illustrated in FIGS. 6A and 6B, the triangle icon can also display an additional icon or text to further communicate the current situation to the driver for clarification. For example and as illustrated, a road work icon or tailgating icon can be displayed at a center of the triangle to inform the human operator of such conditions.

With reference to FIGS. 7A-7D, the exemplary triangular icon can be configured to graphically show the system 10 (such as the HMI 30) listening to voice commands from the driver, such as by using directional triangular shapes traveling outside to inward of the primary triangle shape graphic. When the system 10 (such as the HMI 30) is speaking to the human, the triangle icon can be configured such that the voice graphic travels inward to outward. Voice representation of the HMI 30 speaking to the human can also be shown in the center of the triangular shape.

The present disclosure thus provides numerous advantages. For example, the present disclosure includes a co-pilot system 10 that allows drivers of autonomous vehicles, as well as the autonomous vehicles themselves, to enter and exit system states based on the human's need/want to be in control as well as the autonomous vehicle's capability of being in control. The system 10 includes HMI information display/warning components 30, such as the following: visual (a head-up display; cluster; center stack; other visual warning channels; surrounding LED lighting); audio (chime/warning; text-to-speech; intelligence speech agency); other modalities (haptic feedback; scent feedback).

The system 10 further includes a driver status monitor 50, including any suitable cameras, driver sensors, and/or vehicle sensors configured to monitor the status of the human and the vehicle. A vehicle status monitor 50 includes internal/external vehicle sensors, intelligence diagnose algorithms, etc. The human/autonomous drive status and transition module 40 includes HMI components to allow transition or other vehicle operation, such as an activation/deactivation mechanism and emergency exit strategies.

If the human-car-co-driving system 10 is in the "human driving state," and the vehicle 12 enters a roadway in which AD (autonomous drive) is available from an AD not available road section while the driver is fully ready to drive, then HMI 30 uses moderate visual cues and audio cues to inform the human operator that the vehicle 12 can drive and is ready for AD activation by module 20 (i.e., transition to "human not driving state" becomes an allowable system state).

If the human-car-co-driving system 10 is in the "human driving state" and the human driver becomes distracted or sleepy and the vehicle 12 is not AD capable, and DSM 50 detects that the driver is no longer sufficient to maintain safe driving, then HMI 30 uses strong visual cues (in HUD, cluster, and center stack) in conjunction with strong audio warnings (e.g., warning chime, text-2-speech), haptic warnings, or scent warnings to help the human operator regain readiness.

If the human-car-co-driving system 10 is in the "human driving state" and the human and vehicle 12 are fully ready to drive and then the vehicle 12 enters a roadway in which AD is not available, then HMI 30 uses mild visual or audio cues (such as moderate visual change in HUD, cluster, center stack, or a light chime) to inform the driver that the vehicle 12 cannot drive and is not ready for AD activation.

If the human-car-co-driving system 10 is in the "human driving state" and the human and car 12 are fully ready to drive, then the human driver can intentionally hand over the control to the AD system 20 in which HMI 30 uses an activation mechanism (such as an activation button) to activate AD driving, and display confirmation through visual (HUD, cluster, center stack) or audio (chime, text-to-speech) means to inform the driver of this transition (transition to a "human not driving state" becomes an allowable system state).

If the human-car-co-driving system 10 is in the "human driving state" and the human and car are fully ready to drive, but the human driver becomes distracted or sleepy, and DSM detects that the driver is no longer sufficient to maintain safe driving, then HMI 30 uses strong visual cues (in HUD, cluster, and center stack) in conjunction with strong audio warnings (e.g., warning chime, text-2-speech), haptic warnings, or scent warnings to help the human operator to regain readiness.

If the human-car-co-driving system 10 is in the "human driving state" and the car 12 is ready to drive, but the human driver is not ready to drive due to distractions or sleepiness, but then regains alertness within a threshold, and DSM 50 detects that the driver has regained alertness, then HMI 30 uses moderate visual cues (in HUD, cluster, and center stack) and/or mild audio cues such as a chime or text-to-speech to inform the driver that readiness has occurred.

If the human-car-co-driving system 10 is in the "human driving state" and the car 12 is ready to drive, but the human driver is not ready to drive due to distractions or sleepiness and then the car 12 can no longer perform AD within a threshold due to AD module 20 not being available, and DSM 50 detects that the driver is no longer sufficient to maintain safe driving; then HMI 30 uses strong visual cues (in HUD, cluster, and center stack) in conjunction with strong audio warnings (e.g. warning chime, text-to-speech), haptic warnings, or scent warnings to help the human operator to regain readiness as well as warn of autonomous drive by module 20 not being available.

If the human-car-co-driving system 10 is in the "human driving state" and the car 12 is ready to drive, but the human driver is not ready to drive due to distractions or sleepiness and the human does not regain alertness within a threshold, and the DSM 50 detects that the driver is no longer sufficient to maintain safe driving, then HMI 30 displays confirmation that the car has transitioned to a human not driving state through visual (HUD, cluster, center stack) or audio (chime, text-2-speech) means (transition to a "human not driving state" becomes an allowable system state).

If the human-car-co-driving system 10 is in the "human driving state," but both the human driver (due to distractions or sleepiness) and the car 12 are not ready to drive but the human regains alertness within a threshold, and DSM 50 detects that the driver has regained this alertness, then HMI 30 uses moderate visual cues (in HUD, cluster, and center stack) and/or mild audio cues (such as a chime or text-to-speech) to inform the driver of this transition to readiness.

If the human-car-co-driving system 10 is in the "human driving state," but both the human driver (due to distractions or sleepiness) and the car 12 are not ready to drive, but within a predetermined time threshold the car 12 enters a roadway in which AD is available from the AD module 20, then HMI 30 uses moderate visual cues (in HUD, cluster, center stack) or uses mild audio cues (such as chime and text-to-speech) to inform the driver that the vehicle 12 can drive and is ready for AD activation (transition to a "human not driving state" becomes an allowable system state).

If the human-car-co-driving system 10 is in the "human driving state," but both the human driver (due to distractions or sleepiness) and the car 12 are not ready to drive and a predetermined time threshold is exceeded in which the car does not enter an AD capable roadway and the DSM 50 detects that the driver does not regain alertness, then the system 10 uses an emergency exit strategy (e.g., pull over, stop in current lane, turn on hazards, contact EMS) to seek help and the HMI 30 sends strong visual (in HUD, cluster, and center stack) audio (e.g., warning chime, text-to-speech), and haptic warnings, as well as scent interventions, to attempt to alert the driver.

If the human-car-co-driving system 10 is in the "human not driving state" and the human is ready to drive, but the car 12 is not ready to drive due to AD roadway unavailability, when the human reacts within a predetermined time threshold to take control back to the human driving state, then the system 10 uses a deactivation mechanism (such as a deactivation button) to deactivate AD driving. The HMI 30 displays confirmation through visual (HUD, cluster, center stack) or audio (chime, text-to-speech) means to inform the driver of this transition (transition to a "human driving state" becomes an allowable system state).

If the human-car-co-driving system is in the "human not driving state," and the human is ready to drive but the car is not, and within a predetermined time threshold, the car enters a roadway in which AD is available from an AD not available roadway, then the HMI 30 uses moderate visual cues (in HUD, Cluster, Center stack) or uses mild audio cues (such as chime and text-to-speech) to inform the driver that the AD module 20 can drive the car 12 again.

If the human-car-co-driving system 10 is in the "human not driving state" and the human is ready to drive but the car is not ready to drive due to AD roadway unavailability, and a predetermined time threshold for human response is exceeded (for example, if the human chooses not to react) and the DSM 50 detects that the driver is no longer responding to maintain safe driving, then the HMI 30 uses strong visual cues (in HUD, cluster, and center stack) in conjunction with strong audio warnings (e.g. warning chime, text-2-speech), haptic warnings, or scent interventions to help the human operator regain readiness.

If the human-car-co-driving system 10 is in the "human not driving state" and the human and car are ready to drive, but the human wants to take control back to the human driving state, then the system 10 uses a deactivation mechanism (such as a deactivation button actuated by the human) to deactivate the AD module 20, and the HMI 30 displays confirmation through visual (HUD, cluster, center stack) or audio (chime, text-to-speech) means to inform the driver of this transition (transition to a "human driving state" becomes an allowable system state).

If the human-car-co-driving system is in the "human not driving state" and the human and vehicle 12 are ready to drive, but the system 10 no longer has AD availability as the vehicle 12 enters a roadway where AD is not available and needs human intervention soon, then the HMI 30 uses strong visual cues (in HUD, cluster, center stack) in conjunction with strong audio warnings (e.g., warning chime, text-to-speech), haptic warnings, or scent intervention to inform the human operator to regain readiness.

If the human-car-co-driving system 10 is in the "human not driving state" and the human and car 12 are fully ready to drive, but the human driver becomes distracted or sleepy, and the DSM 50 detects that the driver is no longer sufficient to maintain safe driving, then the HMI 30 uses strong visual cues (in HUD, cluster, and center stack) in conjunction with strong audio warnings (e.g. warning chime, text-2-speech), haptic warnings, or scent warnings to help the human operator to regain readiness.

If the human-car-co-driving system 10 is in the "human not driving state" and the AD module 20 is ready to drive, and the human driver is not ready to drive due to distractions or sleepiness but then regains alertness within a threshold, and the DSM 50 detects that the driver has regained alertness, then the HMI 30 uses moderate visual cues (in HUD, cluster, and center stack) and/or mild audio cues such as a chime or text-to-speech to inform the driver that readiness has occurred.

If the human-car-co-driving system 10 is in the "human not driving state" and the car 12 is ready to drive, but the human driver is not ready to drive due to distractions or sleepiness and then the car 12 can no longer perform AD due to AD module 20 not being available, and within a predetermined time threshold the DSM 50 detects that the driver is no longer able to maintain safe driving, then the HMI 30 uses strong visual cues (in HUD, cluster, and center stack) in conjunction with strong audio warnings (e.g. warning chime, text-to-speech), haptic warnings, or scent warnings to help the human operator to regain readiness as well as warn the human operator that the autonomous drive module 20 is unable to operate the car 12.

If the human-car-co-driving system 10 is in the "human not driving state" and the human driver (due to distractions or sleepiness) is not ready to drive and the AD module 20 is ready to drive but a predetermined time threshold is exceeded in which the DSM 50 detects that the driver has not responded (e.g., incapacitated, heart attack, fallen asleep, distracted), then the system 10 and AD module 20 use an emergency exit strategy (e.g. pull over, stop in current lane, turn on hazards, contact EMS) to seek help and the HMI 30 sends strong visual (in HUD, cluster, and center stack) audio (e.g., warning chime, text-to-speech), and haptic warnings, as well as scent interventions, to attempt to alert the driver.

If the human-car-co-driving system 10 is in the "human not driving state" and both the human driver (due to distractions or sleepiness) and the AD module 20 are not ready to drive and a threshold for a human response is exceeded (e.g., incapacitated, heart attack, fallen asleep, distracted) and the DSM 50 detects that the driver is no longer capable of maintaining safe driving and the AD module 20 is unavailable, then the system 10 uses an emergency exit strategy (e.g., pull over, stop in current lane, turn on hazards, contact EMS) to seek help and the HMI 30 sends strong visual (in HUD, cluster, and center stack), audio (e.g. warning chime, text-2-speech), and haptic warnings, as well as scent interventions, to attempt to alert the driver.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for monitoring vehicle drive states and transitioning between human drive control and autonomous drive control based on the vehicle drive states, the system comprising:
   a human/autonomous drive status and transition module configured to:
   receive data from an autonomous drive module and determine a drive state of the autonomous drive module based on the data received from the autonomous drive module;
   receive data from a driver status monitor (DSM) to determine a drive state of a human driver; and
   transition between human drive control and autonomous drive control by the autonomous drive module, and vice-versa, based on the determined drive states of the human driver and the autonomous drive module; and
   a human-machine interface configured to generate a first alert of a first intensity when the DSM determines that the driver is in a distracted state, and generate a second alert of a second intensity that is greater than the first intensity when the DSM determines that the driver is incapacitated.

2. The system of claim 1, further comprising an input that when operated by the human driver activates the autonomous drive module to autonomously operate the vehicle.

3. The system of claim 1, wherein when the driver fails to assume operation of the vehicle within a predetermined time threshold as determined by the DSM, the autonomous drive module assumes autonomous control of the vehicle or performs an emergency stop of the vehicle.

4. The system of claim 1, wherein when the autonomous drive module cannot operate the vehicle and the DSM determines that the driver is incapacitated, the autonomous drive module performs an emergency stop of the vehicle.

5. The system of claim 1, wherein when the autonomous drive module is operating the vehicle, and the DSM identifies that the driver is not paying attention to operation of the vehicle, the human/autonomous drive status and transition module is configured to operate the human machine interface to generate alerts instructing the human driver to pay attention to operation of the vehicle by the autonomous drive module.

6. The system of claim 1, wherein the human/autonomous drive status and transition module is further configured to generate alerts of different intensities to the driver based on the determined drive state of the human driver and the determined drive state of the autonomous drive module.

7. The system of claim 6, wherein the alerts include at least one of the following: a head-up display visual alert, an instrument cluster visual alert, a center stack visual alert, haptic feedback, scent feedback, and an audio alert including at least one of a chime and text-to-speech.

8. The system of claim 6, wherein the alerts include an alert informing the driver that the autonomous drive module cannot control the vehicle.

9. The system of claim 6, wherein the alerts inform the driver of current actions being taken by the autonomous drive module to prepare the driver for potential manual control.

10. The system of claim 6, wherein the alerts inform the driver of anticipated actions of the autonomous drive module.

11. The system of claim 6, wherein the alerts include icons having a triangular shape.

12. A system for monitoring vehicle drive states of a vehicle and transitioning between human drive control and autonomous drive control based on the vehicle drive states, the system comprising:
    an autonomous drive module configured to autonomously drive the vehicle;
    a driver status monitor (DSM) configured to assess an alertness level of a human driver;

a human-machine interface configured to generate alerts of different intensities to the driver based on the alertness level of the human driver and state of the autonomous drive module to autonomously drive the vehicle;

wherein the human-machine interface generates a first alert of a first intensity when the DSM determines that the driver is in a distracted state and the autonomous drive module is active and operational to autonomously drive the vehicle; and wherein the human-machine interface generates a second alert of a second intensity that is greater than the first intensity when the DSM determines that the driver is in the distracted state and the autonomous drive module cannot autonomously drive the vehicle.

13. The system of claim 12, wherein when the driver fails to enter a non-distracted state after a predetermined period of time and the autonomous drive module cannot autonomously drive the vehicle, the autonomous drive module is configured to perform an emergency stop of the vehicle.

14. The system of claim 12, wherein the first alert and the second alert are at least one of the following generated by the human-machine interface: a head-up display visual alert, an instrument cluster visual alert, a center stack visual alert, haptic feedback, scent feedback, and an audio alert including at least one of a chime and text-to-speech.

15. The system of claim 12, wherein the first alert informs the driver of current actions being taken by the autonomous drive module to prepare the driver for manual control.

16. The system of claim 12, wherein the first alert informs the driver of anticipated actions of the autonomous drive module.

17. The system of claim 12, wherein at least one of the first alert and the second alert include an icon having a triangular shape.

18. The system of claim 12, wherein the second alert informs the driver that the autonomous drive module cannot operate the vehicle and the driver must assume manual control of the vehicle.

19. The system of claim 18, wherein when the driver fails to manually control the vehicle after a predetermined period of time, the autonomous drive module performs an emergency stop of the vehicle.

* * * * *

UNITED STATES PATENT AND TRADEMARK OFFICE
CERTIFICATE OF CORRECTION

| | | |
|---|---|---|
| PATENT NO. | : 10,948,911 B2 | Page 1 of 1 |
| APPLICATION NO. | : 15/939590 | |
| DATED | : March 16, 2021 | |
| INVENTOR(S) | : Vikas Upmanue et al. | |

It is certified that error appears in the above-identified patent and that said Letters Patent is hereby corrected as shown below:

In the Claims

Column 18, Line 53: In Claim 9, after "for", delete "potential"

Column 20, Lines 15-16: In Claim 18, delete "assume manual control of" and insert --control-- therefor Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*